United States Patent

[11] 3,617,545

| [72] | Inventors | Jean-Claude Dubois;<br>Claude Duchesne, both of Paris, France |
|---|---|---|
| [21] | Appl. No. | 19,018 |
| [22] | Filed | Mar. 12, 1970 |
| [45] | Patented | Nov. 2, 1971 |
| [73] | Assignee | Thomson-CSF<br>Paris, France |
| [32] | Priority | Mar. 13, 1969 |
| [33] | | France |
| [31] | | 69/7130 |

[54] REMOVING UREA FROM SALINE WATER SOLUTIONS PARTICULARLY IN AN ARTIFICIAL KIDNEY
12 Claims, 1 Drawing Fig.

[52] U.S. Cl. ................................................ 210/22,
204/180 P, 204/301, 210/321
[51] Int. Cl. ........................................................ B01d71/00,
B01d 13/00

[50] Field of Search........................................... 210/22,
321; 204/180 P, 301

[56] References Cited
UNITED STATES PATENTS

| 3,268,441 | 8/1966 | Lindstrom..................... | 210/22 |
| 3,463,728 | 8/1969 | Kolobrew et al............... | 210/22 |

OTHER REFERENCES
Flower, Industrial Research Fellow Report No. 4, Chemical Engineer, May 1968, pp. 120–131

Primary Examiner—Samih N. Zaharna
Assistant Examiner—Richard Barnes
Attorney—Flynn & Frishauf ABSTRACT: Urea is removed from ultrafiltrate or dialysate by demineralizing the saline solution thereof, hydrolyzing the urea to ammonium carbonate, removing the carbonate with a cationic exchange resin and then remineralizing the resulting solution. An electrodialyzer for employing this method is described.

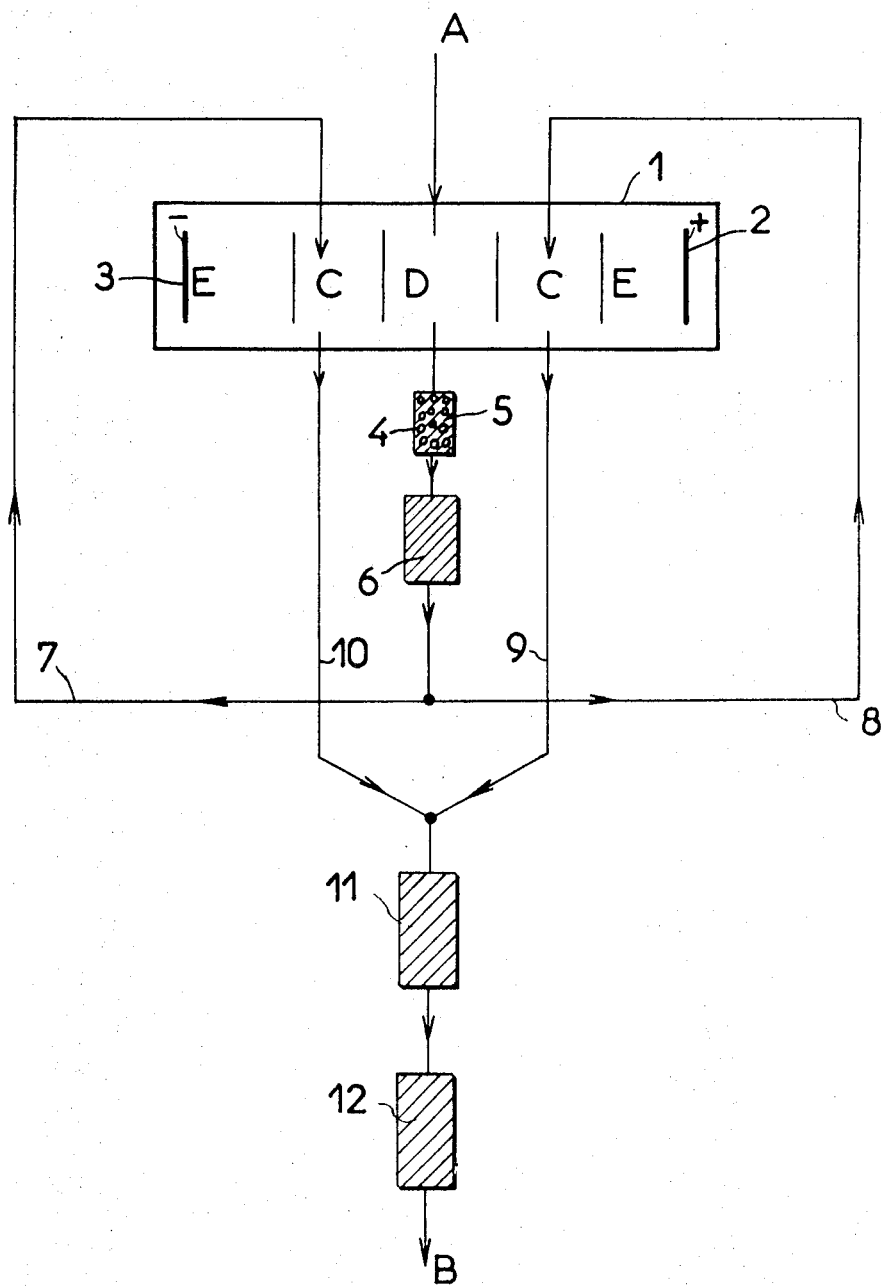

REMOVING UREA FROM SALINE WATER SOLUTIONS PARTICULARLY IN AN ARTIFICIAL KIDNEY

FIELD OF THE INVENTION

The present invention relates to improvements in/or relating to methods of and devices for elimination urea from saline solutions, and in particular in an artificial kidney.

BACKGROUND OF THE INVENTION

The majority of the methods hitherto known for the elimination of urea contained in blood, are based upon the utilization of the phenomenon of dialysis and the rejection of the purifying bath after dialysis. This method of elimination has the major drawback of requiring a dialysis bath of very considerable volume, a volume which can indeed attain some 600 liters, and a very expensive dosing pump for operating said bath.

Another method of eliminating urea consists in operating on the blood itself by processing the plasma (also named ultrafiltrate) obtained after an ultrafine filtration operation, in a device which generally comprises one, two or more ultrafine filtration diaphragms. In a device of this kind, at one side of the diaphragm or diaphragms blood circulates under superatmospheric pressure so that a portion of water charged with ions, with urea, with a certain number of compounds of molecular weight less than 70,000 and other metabolic products, such as creatinine or uric acid, can pass across the diaphragm or diaphragms. The filtrate thus obtained is then purified before rejection into the patient in order to compensate for the water loss and electrolyte loss.

A major object of the present invention is to provide an improved method of an device for purifying a dialysis bath or ultrafiltrate, charged with urea and other products, by closed-circuit circulation of the dialysis bath or ultrafiltrate.

It is thus possible either to reutilize the dialysis bath and to limit its volume, or to purify the ultrafiltrate prior to reinjection into the patient, this in a device which is small in size and easy to manufacture.

SUMMARY OF THE INVENTION

In accordance with the present invention, there is provided a method for removing urea from blood, comprising
 a. demineralizing a saline water solution containing urea; this solution proceeding from adialysis or an ultrafiltration of blood
 b. hydrolyzing urea of the demineralized solution of (a) to ammonium carbonate;
 c. contacting the product of (b) with a cationic exchange resin, whereby the ammonium carbonate is removed therefrom; and
 d. remineralizing the product of (c).

In accordance with the present invention, there is also provided apparatus for removing urea from blood, comprising in combination:
 a. an electrodialyzer comprising anode and cathode compartments separated by concentrating compartments which are separated by dilution compartments;
 b. means for charging a saline water solution containing urea to a dilution compartment of said electrodialyzer;
 c. a hydrolysis vessel and means for connecting the same with the exit of said dilution compartment;
 d. a column of a cationic exchange resin and means for connecting the same with the exit of said hydrolysis vessel;
 e. and means connecting the exit of the column of (d) with concentrating compartments of said electrodialyzer.

SPECIFIC EMBODIMENTS OF THE INVENTION

A saline solution which constitutes the dialysis bath or the ultrafiltrate, is demineralized in dilution compartments of an electrodialyzer forming part of the device, and the urea left behind in the solution is hydrolized using urease. The urea is hydrolized to ammonium carbonate which is subsequently contacted with and retained by cation-exchanging resin. After removal of the ammonium carbonate, the resulting saline solution is fed into a concentrating compartment of the electrodialyzer where the lost ions are restored to it. The saline solution thus recharged with ions, is contacted with active carbon which retains any uric acid and creatinine of the saline solution, then is contacted with an anionic resin which eliminates phosphates and sulphates, and is ultimately reinjected into the patient if the saline solution used is an ultrafiltrate, or into the processing circuit if the saline solution used is a dialysis bath.

The attached FIGURE schematically illustrates an example of a device for eliminating urea, in accordance with the invention, which device is suitable for implementing the method hereinbefore described.

The device comprises electrodialyzer 1 comprising electrodes 2 and 3 for current supply, and a plurality of compartments comprising electrode compartments E, concentrating compartments C, and dilution compartment or dilution compartments D. The saline solution coming from the dialysis bath or the ultrafiltrate, and which contains water, urea, and salts such as NaCl, is charged from A into dilution compartment D wherein it is deionized, Deionized solution is removed from electrodialyzer 1, and is passed to vessel 4 in which hydrolysis of the urea dissolved in the saline solution, is carried out. Vessel 4 can be a column containing small capsules 5 made up of water-permeable plastic material and containing urease, these capsules being prepared for example by using a suspension of urease in a solution of coagulated collodion in water. In a variant embodiment, vessel 4 can comprise diaphragms or membranes which will retain urease.

In vessel 4, the urea present in the original saline solution is hydrolized by the urease and the resultant product is ammonium carbonate, $(NH_4)_2CO_3$, in solution. This Solution is passed from vessel 4 to column 6 containing a cation-exchanging resin, in the form of a sulfonic acid or a sodium sulfonate. The ammonium ion ($NH_4+$) of the carbonate is retained by the cationic resin and if the latter is in acid form, then carbon dioxide gas ($CL_2$) is liberated. If the cationic resin is in the form of a sodium sulfonate, then sodium carbonate is liberated by the resin. As a guide, a quantity of resin of the order of 2 liters will suffice for a purification. Solution is passed from column 6 through lines 7 and 8 which lead into concentrating compartments C of electrodialyzer 1. Solution exiting from column 6 is substantially free of $CO_2$ or contains sodium carbonate, depending upon the nature of the resin used. In compartments C, the saline solution recovers the ions which it lost initially on passing through compartment D. Solution is passed from compartments C through lines 9 and 10 into purifier 11, which is designed to remove uric acid and creatinine and comprises a column of active carbon. As a guide, 0.5 to 1 liter of carbon will generally suffice for a purification. From vessel or purifier 11, the resulting saline solution is passed to purifier 12 which is designed to eliminate phosphates and sulfates present therein. Purifier 12 comprises a column of anionic resin previously balanced with ions contained in the ultrafiltrate or in the dialysis bath, these ions principally being chlorine and acetate ions. This balance or equilibrium is achieved by prolonged immersion of the anionic resin in the dialysis bath itself, for example. At the exit B from column 12, the resulting liquid is reinjected into the patient in the case of an ultrafiltrate, or into the processing circuit if it is a dialysis bath which is involved.

Another embodiment comprises utilizing a single column containing a mixture of the urease capsules, the cationic resin, the active carbon, and the anionic resin, recycling to the concentrating compartments of the electrodialyzer, followed by subsequent reinjection into the patient or into the processing circuit.

The foregoing description has been given purely by way of nonlimitative example, but the invention extends equally to other variant embodiments.

TYPICAL EXAMPLE

A filtrate containing:

11.8 g. of sodium chloride
1 g. urea
195 mg. creatinine, and
116 mg. uric acid
per liter of a aqueous solution is placed in the dilution compartments of the electrodialyzer 1, having the following characteristics:
membranes: IONAC MA 3148
MC. 3142
27 compartments
1.16 square meters of membrane.

A constant current of 95 mA. is passed through the apparatus. The solution yield is 600 ml. per hour.

The vessel 4 contains 14,5 millimeters of urease capsules formed of urease collodion, representing 3 grams of urease.

The column 6 contains 1 liter of amberlite resin IR 120 in acidic form.

Column 11 contains 380 ml. of active carton CECA AC 45.

The column 12 contains 3 liters of amberlite resin IRA 400, previously equilibrated with chloride ions.

The output concentrations are:
urea: 0.4 gram per liter
creatinine: 0.01 milligram per liter
uric acid: 0.05 milligram per liter
sodium chloride: 11.9 grams per liter.

These concentrations are constant for 50 hours.

Cationic resins which can be used in column 6 are strong acid type, for example those supplied by amberlite, IR 120 type or by Dowex, 50 type.

Typical active carbons which can be used in purifier 11 are those supplied by C.E.A., AC45 type or AC90 type.

Typical anionic resins for use in purifier 12 are amberlite IRA 400 or permutit S1.

It is necessary to maintain a critical current supplied to the electrodialyzer in range of 80 to 100 mA.

What is claimed is:
1. A method of removing urea from blood which comprises
   a. demineralizing a saline water solution containing urea by passing said solution through an electrodialyzer. This solution proceeding from a dialysis or an ultrafiltration of blood.
   b. hydrolyzing urea of the demineralized solution of (a) to ammonium carbonate;
   c. contacting the product of (b) with a cationic exchange resin, whereby the ammonium carbonate is removed therefrom; and
   d. remineralizing by passing the product of (c) through the concentration cells of said electrodialyzer.

2. The method of claim 1, wherein the product of (d) is contacted with an activated carbon, whereby any uric acid or creatinine present in said saline water solution is removed.

3. The method of claim 2, wherein the filtrate obtained in claim 2 is contacted with an anionic exchange resin, whereby phosphates and sulfates present in said saline water solution are removed.

4. The method of claim 1, wherein the urea of the demineralized solution is hydrolyzed with urease to ammonium carbonate in (b).

5. The method of claim 4, wherein the urease is enveloped in a capsule of a water-permeable plastic material in (b).

6. The method of claim 3, wherein the anionic exchange resin is one equilibrated with ions present in said saline solution.

7. Apparatus for removing urea from blood comprising in combination
   a. an electrodialyzer comprising anode and cathode compartments separated by concentrating compartments which are separated by dilution compartments;
   b. means for charging a saline water solution containing urea to a dilution compartment of said electrodialyzer;
   c. a hydrolysis vessel and means for connecting the same with the exit of said dilution compartment;
   d. a column of cationic exchange resin and means for connecting the same with the exit of said hydrolysis vessel;
   e. and means connecting the exit of the column of (d) with concentrating compartments of said electrodialyzer.

8. Apparatus of claim 7, containing (f) a column of activated carbon and means for connecting the same with the exit of said concentrating compartments.

9. Apparatus of claim 8, containing (g) a column of an anionic exchange resin and means for connecting the same with the exit of said activated carbon column.

10. Apparatus of claim 9, wherein (c), (d), (e), (f) and (g) are contained in a single processing column.

11. Apparatus of claim 7, wherein the hydrolysis vessel contains a diaphragm which retains urease.

12. Apparatus of claim 9, wherein the anionic exchange resin is one equilibrated with ions present in said saline solution.

* * * * *